US 7,773,118 B2

(12) United States Patent
Florea et al.

(10) Patent No.: US 7,773,118 B2
(45) Date of Patent: Aug. 10, 2010

(54) HANDHELD ARTICLE WITH MOVEMENT DISCRIMINATION

(75) Inventors: Corneliu Florea, Bucharest (RO); Felix Albu, Bucharest (RO); Adrian Zamfir, Bucharest (RO); Alexandru Drimbarean, Galway (IE)

(73) Assignee: FotoNation Vision Limited, Galway (IE)

( * ) Notice: Subject to any disclaimer, the term of this patent is extended or adjusted under 35 U.S.C. 154(b) by 700 days.

(21) Appl. No.: 11/690,836

(22) Filed: Mar. 25, 2007

(65) Prior Publication Data

US 2008/0231713 A1    Sep. 25, 2008

(51) Int. Cl.
*H04N 5/228* (2006.01)
*G03B 17/00* (2006.01)

(52) U.S. Cl. .............................. 348/208.99; 348/208.2; 348/208.3; 396/55

(58) Field of Classification Search ..............................
348/208.99–208.16; 33/318–330; 396/13
See application file for complete search history.

(56) References Cited

U.S. PATENT DOCUMENTS

| | | |
|---|---|---|
| 5,251,019 A | 10/1993 | Moorman et al. |
| 5,374,956 A | 12/1994 | D'Luna |
| 5,392,088 A | 2/1995 | Abe et al. |
| 5,428,723 A | 6/1995 | Ainscow et al. |
| 5,510,215 A | 4/1996 | Prince et al. |
| 5,599,766 A | 2/1997 | Boroson et al. |
| 5,686,383 A | 11/1997 | Long et al. |
| 5,747,199 A | 5/1998 | Roberts et al. |
| 5,751,836 A | 5/1998 | Wildes et al. |
| 5,756,239 A | 5/1998 | Wake |
| 5,756,240 A | 5/1998 | Roberts et al. |
| 5,802,220 A | 9/1998 | Black et al. |
| 5,889,277 A | 3/1999 | Hawkins et al. |
| 5,889,554 A | 3/1999 | Mutze |
| 5,909,242 A | 6/1999 | Kobayashi et al. |
| 5,981,112 A | 11/1999 | Roberts |
| 6,028,960 A | 2/2000 | Graf et al. |
| 6,035,072 A | 3/2000 | Read |
| 6,061,462 A | 5/2000 | Tostevin et al. |
| 6,081,606 A | 6/2000 | Hansen et al. |
| 6,114,075 A | 9/2000 | Long et al. |

(Continued)

FOREIGN PATENT DOCUMENTS

DE    3729324 A1    3/1989

(Continued)

OTHER PUBLICATIONS

Cannon M., Blind Deconvolution of Spatially Invariant Image Blurs with Phase, IEEE Transactions on Acoustics, Speech, and Signal Processing, 1976, vol. ASSP-24, No. 1.

(Continued)

*Primary Examiner*—Jason Chan
*Assistant Examiner*—Pritham Prabhakher
(74) *Attorney, Agent, or Firm*—Andrew V. Smith

(57) ABSTRACT

A digital camera has a pair of angular rate-sensing gyroscopic sensors with mutually perpendicular axes and an electronic circuit responsive to the sensor output signals to discriminate between voluntary and involuntary movements of the article as a function of the number of zero crossings per unit time of the signal and the average of the absolute amplitude of the signal.

10 Claims, 4 Drawing Sheets

U.S. PATENT DOCUMENTS

| | | | |
|---|---|---|---|
| 6,124,864 A | 9/2000 | Madden et al. | |
| 6,134,339 A | 10/2000 | Luo | |
| 6,269,175 B1 | 7/2001 | Hanna et al. | |
| 6,297,071 B1 | 10/2001 | Wake | |
| 6,297,846 B1 | 10/2001 | Edanami | |
| 6,326,108 B2 | 12/2001 | Simons | |
| 6,330,029 B1 | 12/2001 | Hamilton et al. | |
| 6,360,003 B1 | 3/2002 | Doi et al. | |
| 6,365,304 B2 | 4/2002 | Simons | |
| 6,387,577 B2 | 5/2002 | Simons | |
| 6,407,777 B1 | 6/2002 | DeLuca | |
| 6,535,244 B1 | 3/2003 | Lee et al. | |
| 6,555,278 B1 | 4/2003 | Loveridge et al. | |
| 6,567,536 B2 | 5/2003 | McNitt et al. | |
| 6,599,668 B2 | 7/2003 | Chari et al. | |
| 6,602,656 B1 | 8/2003 | Shore et al. | |
| 6,607,873 B2 | 8/2003 | Chari et al. | |
| 6,618,491 B1 | 9/2003 | Abe | |
| 6,625,396 B2 | 9/2003 | Sato | |
| 6,643,387 B1 | 11/2003 | Sethuraman et al. | |
| 6,741,960 B2 | 5/2004 | Kim et al. | |
| 6,863,368 B2 | 3/2005 | Sadasivan et al. | |
| 6,892,029 B2 | 5/2005 | Tsuchida et al. | |
| 6,947,609 B2 | 9/2005 | Seeger et al. | |
| 6,961,518 B2 | 11/2005 | Suzuki | |
| 7,019,331 B2 | 3/2006 | Winters et al. | |
| 7,072,525 B1 | 7/2006 | Covell | |
| 7,084,037 B2 | 8/2006 | Gamo et al. | |
| 7,160,573 B2 | 1/2007 | Sadasivan et al. | |
| 7,177,538 B2* | 2/2007 | Sato et al. | 396/55 |
| 7,180,238 B2 | 2/2007 | Winters | |
| 7,195,848 B2 | 3/2007 | Roberts | |
| 7,269,292 B2 | 9/2007 | Steinberg | |
| 7,292,270 B2* | 11/2007 | Higurashi et al. | 348/208.3 |
| 7,315,324 B2 | 1/2008 | Cleveland et al. | |
| 7,315,630 B2 | 1/2008 | Steinberg et al. | |
| 7,315,631 B1 | 1/2008 | Corcoran et al. | |
| 7,316,630 B2 | 1/2008 | Tsukada et al. | |
| 7,316,631 B2 | 1/2008 | Tsunekawa | |
| 7,317,815 B2 | 1/2008 | Steinberg et al. | |
| 7,336,821 B2 | 2/2008 | Ciuc et al. | |
| 7,369,712 B2 | 5/2008 | Steinberg et al. | |
| 7,403,643 B2 | 7/2008 | Ianculescu et al. | |
| 7,453,493 B2* | 11/2008 | Pilu | 348/208.6 |
| 7,453,510 B2 | 11/2008 | Kolehmainen | |
| 7,460,695 B2 | 12/2008 | Steinberg et al. | |
| 7,469,071 B2 | 12/2008 | Drimbarean et al. | |
| 7,489,341 B2* | 2/2009 | Yang et al. | 348/208.99 |
| 7,548,256 B2* | 6/2009 | Pilu | 348/208.3 |
| 7,551,755 B1 | 6/2009 | Steinberg et al. | |
| 7,565,030 B2 | 7/2009 | Steinberg et al. | |
| 7,593,144 B2 | 9/2009 | Dymetman | |
| 7,623,153 B2* | 11/2009 | Hatanaka | 348/208.3 |
| 2001/0036307 A1 | 11/2001 | Hanna et al. | |
| 2002/0006163 A1 | 1/2002 | Hibi et al. | |
| 2003/0052991 A1 | 3/2003 | Stavely et al. | |
| 2003/0058361 A1 | 3/2003 | Yang | |
| 2003/0091225 A1 | 5/2003 | Chen | |
| 2003/0103076 A1 | 6/2003 | Neuman | |
| 2003/0151674 A1 | 8/2003 | Lin | |
| 2003/0152271 A1 | 8/2003 | Tsujino et al. | |
| 2003/0169818 A1 | 9/2003 | Obrador | |
| 2003/0193699 A1 | 10/2003 | Tay | |
| 2003/0219172 A1 | 11/2003 | Caviedes et al. | |
| 2004/0066981 A1 | 4/2004 | Li et al. | |
| 2004/0076335 A1 | 4/2004 | Kim | |
| 2004/0090532 A1 | 5/2004 | Imada | |
| 2004/0120598 A1 | 6/2004 | Feng | |
| 2004/0120698 A1 | 6/2004 | Hunter | |
| 2004/0145659 A1 | 7/2004 | Someya et al. | |
| 2004/0169767 A1 | 9/2004 | Norita et al. | |
| 2004/0212699 A1 | 10/2004 | Molgaard | |
| 2004/0218057 A1 | 11/2004 | Yost et al. | |
| 2004/0218067 A1 | 11/2004 | Chen et al. | |
| 2005/0010108 A1 | 1/2005 | Rahn et al. | |
| 2005/0019000 A1 | 1/2005 | Lim et al. | |
| 2005/0031224 A1 | 2/2005 | Prilutsky et al. | |
| 2005/0041121 A1 | 2/2005 | Steinberg et al. | |
| 2005/0041123 A1 | 2/2005 | Ansari et al. | |
| 2005/0047672 A1 | 3/2005 | Ben-Ezra et al. | |
| 2005/0052553 A1 | 3/2005 | Kido et al. | |
| 2005/0057687 A1 | 3/2005 | Irani et al. | |
| 2005/0068446 A1 | 3/2005 | Steinberg et al. | |
| 2005/0068452 A1 | 3/2005 | Steinberg et al. | |
| 2005/0140801 A1 | 6/2005 | Prilutsky et al. | |
| 2005/0201637 A1 | 9/2005 | Schuler et al. | |
| 2005/0219391 A1 | 10/2005 | Sun et al. | |
| 2005/0231625 A1 | 10/2005 | Parulski et al. | |
| 2005/0248660 A1 | 11/2005 | Stavely et al. | |
| 2005/0259864 A1 | 11/2005 | Dickinson et al. | |
| 2005/0270381 A1 | 12/2005 | Owens et al. | |
| 2006/0006309 A1 | 1/2006 | Dimsdale et al. | |
| 2006/0017837 A1 | 1/2006 | Sorek et al. | |
| 2006/0038891 A1 | 2/2006 | Okutomi et al. | |
| 2006/0039690 A1 | 2/2006 | Steinberg et al. | |
| 2006/0093212 A1 | 5/2006 | Steinberg et al. | |
| 2006/0098237 A1 | 5/2006 | Steinberg et al. | |
| 2006/0098890 A1 | 5/2006 | Steinberg et al. | |
| 2006/0098891 A1 | 5/2006 | Steinberg et al. | |
| 2006/0120599 A1 | 6/2006 | Steinberg et al. | |
| 2006/0125938 A1 | 6/2006 | Ben-Ezra et al. | |
| 2006/0140455 A1 | 6/2006 | Costache et al. | |
| 2006/0170786 A1 | 8/2006 | Won | |
| 2006/0171464 A1 | 8/2006 | Ha | |
| 2006/0187308 A1 | 8/2006 | Lim et al. | |
| 2006/0204034 A1 | 9/2006 | Steinberg et al. | |
| 2006/0204054 A1 | 9/2006 | Steinberg et al. | |
| 2006/0204110 A1 | 9/2006 | Steinberg et al. | |
| 2006/0285754 A1 | 12/2006 | Steinberg et al. | |
| 2007/0025714 A1 | 2/2007 | Shiraki | |
| 2007/0058073 A1 | 3/2007 | Steinberg et al. | |
| 2007/0083114 A1 | 4/2007 | Yang et al. | |
| 2007/0110305 A1 | 5/2007 | Corcoran et al. | |
| 2007/0147820 A1 | 6/2007 | Steinberg et al. | |
| 2007/0189748 A1 | 8/2007 | Drimbarean et al. | |
| 2007/0201724 A1 | 8/2007 | Steinberg et al. | |
| 2007/0234779 A1* | 10/2007 | Hsu et al. | 73/1.79 |
| 2007/0269108 A1 | 11/2007 | Steinberg et al. | |
| 2007/0296833 A1 | 12/2007 | Corcoran et al. | |
| 2008/0037827 A1 | 2/2008 | Corcoran et al. | |
| 2008/0037839 A1 | 2/2008 | Corcoran et al. | |
| 2008/0037840 A1 | 2/2008 | Steinberg et al. | |
| 2008/0043121 A1 | 2/2008 | Prilutsky et al. | |
| 2008/0175481 A1 | 7/2008 | Petrescu et al. | |
| 2008/0219581 A1 | 9/2008 | Albu et al. | |
| 2008/0220750 A1 | 9/2008 | Steinberg et al. | |
| 2008/0231713 A1 | 9/2008 | Florea et al. | |
| 2008/0232711 A1 | 9/2008 | Prilutsky et al. | |
| 2008/0240555 A1 | 10/2008 | Nanu et al. | |
| 2008/0292193 A1 | 11/2008 | Bigioi et al. | |
| 2008/0309769 A1 | 12/2008 | Albu et al. | |
| 2008/0309770 A1 | 12/2008 | Florea et al. | |
| 2009/0003652 A1 | 1/2009 | Steinberg et al. | |
| 2009/0080713 A1 | 3/2009 | Bigioi et al. | |
| 2009/0080796 A1 | 3/2009 | Capata et al. | |
| 2009/0080797 A1 | 3/2009 | Nanu et al. | |
| 2009/0179999 A1 | 7/2009 | Albu et al. | |
| 2009/0185753 A1 | 7/2009 | Albu et al. | |
| 2009/0190803 A1 | 7/2009 | Neghina et al. | |
| 2009/0196466 A1 | 8/2009 | Capata et al. | |

FOREIGN PATENT DOCUMENTS

| | | | |
|---|---|---|---|
| DE | 10154203 A1 | 6/2002 | |

| | | | |
|---|---|---|---|
| DE | 10107004 A1 | 9/2002 |
| EP | 944251 B1 | 4/2003 |
| EP | 1583033 A2 | 10/2005 |
| EP | 1779322 B1 | 1/2008 |
| EP | 1429290 B1 | 7/2008 |
| JP | 10285542 A2 | 10/1998 |
| JP | 11327024 A2 | 11/1999 |
| JP | 2008-520117 T | 6/2008 |
| WO | WO-9843436 A1 | 10/1998 |
| WO | WO-0245003 A1 | 6/2002 |
| WO | WO-03071484 A1 | 8/2003 |
| WO | WO-04001667 A2 | 12/2003 |
| WO | WO-2004036378 A2 | 4/2004 |
| WO | WO-2006050782 A1 | 5/2006 |
| WO | WO-2007093199 A2 | 8/2007 |
| WO | WO-2007093199 A3 | 8/2007 |
| WO | WO-2007142621 A1 | 12/2007 |
| WO | WO-2007143415 A2 | 12/2007 |
| WO | WO-2008017343 A1 | 2/2008 |
| WO | WO-2008131438 A2 | 10/2008 |
| WO | WO-2009036793 A1 | 3/2009 |

OTHER PUBLICATIONS

Co-pending U.S. Appl. No. 11/573,713.
Co-pending U.S. Appl. No. 12/063,089.
Co-pending U.S Appl. No. 12/330,719.
Deller J. et al., Discrete-Time Processing of Speech Signals, 1999, 2nd. Edition, Wiley-IEEE Press.
Deng G. et al., The study of logarithmic image processing model and its application to image enhancement, IEEE Trans. on Image Processing, 1995, pp. 506-512, vol. 4.
Final Office Action mailed Nov. 5, 2008, for U.S. Appl. No. 10/986,562, filed Nov. 10, 2004.
Final Office Action mailed Nov. 13, 2008, for U.S. Appl. No. 10/985,657, filed Nov. 10, 2004.
Final Office Action mailed Nov. 13, 2008, for U.S. Appl. No. 11/566,180, filed Dec. 1, 2006.
Final Office Action mailed Nov. 24, 2008, for U.S. Appl. No. 10/985,650, filed Nov. 10, 2004.
Golub G. H. et al., Matrix Computations, 1996, 3rd edition, John Hopkins University Press, Baltimore.
Gunturk et al., High-Resolution Image Reconstruction from Multiple Differently Exposed Images, IEEE Signal Processing Letters, 2006, vol. 13, No. 4.
Hayes M., Statistical Digital Signal Processing and Modeling, 1996, Wiley.
Haykin S., Adaptive filter theory, 1996, Prentice Hall.
Jannson, Peter A., Deconvolution of Images and Spectra, 1997, 2nd. Edition, Academic Press.
Jourlin M. et al., Logarithmic image processing the mathematical and physical framework for the representation and processing of transmitted images, Advances in Imaging and Electron Physics, 2001, pp. 129-196, vol. 115.
Kuglin C. D. et al., The phase correlation image alignment method, Proc. Int. Conf. Cybernetics and Society, 1975, pp. 163-165, IEEE, Bucharest, Romania.
Lagendijk R. L. et al., Iterative Identification and Restoration of Images, 1991, Kluwer Academic.
Non-Final Office Action mailed Apr. 3, 2008, for U.S. Appl. No. 10/985,650, filed Nov. 10, 2004.
Non-Final Office Action mailed Apr. 4, 2008, for U.S. Appl. No. 10/986,562, filed Nov. 10, 2004.
Non-Final Office Action mailed Apr. 21, 2009, for U.S. Appl. No. 10/985,650, filed Nov. 10, 2004.
Non-Final Office Action mailed Apr. 22, 2009, for U.S. Appl. No. 10/986,562, filed Nov. 10, 2004.
Non-Final Office Action mailed Jun. 1, 2009, for U.S. Appl. No. 10/985,657, filed Nov. 10, 2004.
Non-Final Office Action mailed Jun. 10, 2009, for U.S. Appl. No. 11/566,180, filed Dec. 1, 2006.
Non-Final Office Action mailed Mar. 18, 2008, for U.S. Appl. No. 10/985,657, filed Nov. 10, 2004.
Non-Final Office Action mailed Mar. 21, 2008, for U.S. Appl. No. 11/566,180, filed Dec. 1, 2006.
Non-Final Office Action mailed May 11, 2009, for U.S. Appl. No. 12/199,680, filed Aug. 27, 2008.
Non-Final Office Action mailed May 29, 2009, for U.S. Appl. No. 12/199,710, filed Aug. 27, 2008.
Non-Final Office Action mailed Nov. 4, 2009, for U.S. Appl. No. 11/753,098, filed May 24, 2007.
Notice of Allowance mailed Dec. 1, 2009, for U.S. Appl. No. 12/199,680, filed Aug. 27, 2008.
Notice of Allowance mailed Dec. 11, 2009, for U.S. Appl. No. 12/199,710, filed Aug. 27, 2008.
Notice of Allowance mailed Nov. 2, 2009, for U.S. Appl. No. 10/985,657, filed Nov. 10, 2004.
Notice of Allowance mailed Nov. 17, 2009, for U.S. Appl. No. 11/566,180, filed Dec. 1, 2006.
Notice of Allowance mailed Oct. 29, 2009, for U.S. Appl. No. 10/985,650, filed Nov. 10, 2004.
Notice of Allowance mailed Oct. 29, 2009, for U.S. Appl. No. 10/986,562, filed Nov. 10, 2004.
International Preliminary Report on Patentability, for PCT Application No. PCT/US2007/069638, dated Dec. 10, 2008, 5 pages.
Written Opinion of the International Preliminary Examining Authority, for PCT Application No. PCT/EP2005/011011, dated Oct. 24, 2006, 4 pages.
Pickup, Lyndsey et al., Optimizing and Learning for Super-resolution, BMVC, Sep. 4-7, 2006.
Yuan, Lu et al., Image Deblurring with Blurred/Noisy Image Pairs, SIGGRAPH07, Aug. 5-9, 2007.
Zitova, Barbara et al., Image registration methods: a survey, Image and Vision Computing, 2003, pp. 977-1000, vol. 21.
Andrews, H.C. et al., "Digital Image Restoration", Prentice Hall, 1977.
Bates et al., "Some Implications of Zero Sheets for Blind Deconvolution and Phase Retrieval", J. Optical Soc. Am. A, 1990, pp. 468-479, vol. 7.
Ben Ezra, Moshe et al., "Motion Deblurring Using Hybrid Imaging", Proceedings IEEE Computer Society Conference on Computer Vision and Pattern Recognition, 2003.
Ben-Ezra, M. el al., "Motion-Based Motion Deblurring", IEEE Transactions on Pattern Analysis and Machine Intelligence, 2004, pp. 689-698, vol. 26—Issue 6.
Bennett, Eric P. et al., "Video Enhancement Using Per-Pixel Virtual Exposures", International Conference on Computer Graphics and Interactive Techniques, ACM Siggraph, 2005, pp. 845-852.
Bhaskaran, V. et al., "Motion estimation using a computation-constrained criterion", Digital Signal Processing Proceedings, 1997, pp. 229-232, vol. 1.
Bones et al., "Deconvolution and Phase Retrieval With Use of Zero Sheets", J. Optical Soc. Am. A, 1995, pp. 1,842-1,857, vol. 12.
Chen-Kuei Y. et al., "Color image sharpening by moment-preserving technique", Signal Processing, 1995, pp. 397-403, vol. 45—Issue 3, Elsevier Science Publishers.
Crowley, J. et al., "Multi-modal tracking of faces for video communication, http://citeseer.ist.psu.edu/crowley97multimodal.html", In Computer Vision and Patent Recognition, 1997.
Deever, A., "In-camera all-digital video stabilization", Proceedings of the International Conference on Decision Support Systems Proceedings of ISDSS, 2006, pp. 190-193.
Demir, B. et al., "Block motion estimation using adaptive modified two-bit transform", 2007, pp. 215-222, vol. 1—Isuue 2.
Dufournaud et al., "Matching Images With Different Resolutions", IEEE Conference Proceedings on Computer Vision and Pattern Recognition, 2000.
Elad et al., "Restoration of a Single Superresolution Image from several Blurred, Noisy and Undersampled Measured Images", IEEE Transactions on Image Proc., 1997, vol. 6—Issue 12.
Elad, Michael et al., "Superresolution Restoration of an Image Sequence: Adaptive Filtering Approach", IEEE Transactions on Image Processing, 1999, pp. 529-541, vol. 8—Issue 3.
Favaro, Paolo, "Depth from focus/defocus, http://homepages.inf.ed. ac.uk/rbf/Cvonline/LOCAL_COPIES/FAVARO1/dfdtutorial.html. ", 2002.

Feng, J. et al., "Adaptive block matching motion estimation algorithm using bit plane matching", ICIP, 1995, pp. 496-499.

Fujita K. et al., An edge-adaptive iterative method for image restoration, Singapore ICCS/ISITA '92."Communications on the Move" Singapore 16-20, Nov. 1992, New York, NY, USA, IEEE, US, Nov. 16, 1992,pp. 361-365, XP010066997, ISBN: 0-7803-0803-4.

Jansson, Peter A., "Chapter 1: Convolution and Related Concepts", Deconvolution of Images and Spectra, 1997, 2nd. Edition, Academic Press.

Jiang, Wei et al., "Dense Panoramic Imaging and 3D Reconstruction by Sensors Fusion, http://rlinks2.dialog.com/NASApp/ChannelWEB/DialogProServlet?ChName=engineering", Japan Sci. and Technol. Agency, JPN(JST); National Inst. Industrial Safety, JPN Nippon Kikai Gakkai Robotikusu, Mekatoronikusu Koenkai Koen Ronbunshu (CD-ROM), 2006, pp. 2P1-C15.

Ko, S. et al., "Fast digital image stabilizer based on gray-coded bit-plane matching", IEEE Transactions on Consumer Electronics, 1999, pp. 598-603, vol. 45—Issue 3.

Lane et al., "Automatic multidimensional deconvolution", J. Opt. Soc. Am. A, 1987, pp. 180-188, vol. 4—Issue 1.

Lhuillier, M. et al., "A quasi-dense approach to surface reconstruction from uncalibrated images, http://rlinks2.dialog.com/NASApp/ChannelWEB/DialogProServlet?ChName=engineering", IEEE Transactions on Pattern Analysis and Machine Intelligence, 2005, pp. 418-433, vol. 27—Issue 3, IEEE Comput. Soc.

Mase, Mitsuhito et al., "A Wide Dynamic Range CMOS image Sensor with Multiple Exposure-Time Signal Outputs and 12-bit Column-Parallel Cyclic A/D Converters", IEEE Journal of Solid-State Circuits, 2005, vol. 40—Issue 12.

Natarajan B. et al., "Low-complexity block-based motion estimation via one-bit transforms", IEEE Trans. Circuit Syst. Video Technol, 1997, pp. 702-706, vol. 7—Issue 5.

Oppenheim, A.V. et al., "The Importance of Phase in Signals, XP008060042, ISSN: 0018-9219.", Proceedings of the IEEE, 1981, pp. 529-541, vol. 69—Issue 5.

Park, Sung Cheol et al., "Super-resolution image reconstruction: a technical overview, ISSN: 1053-5888. DOI: 10.1109/MSP.2003.1203207.", Signal Processing Magazine, 2003, pp. 21-36, vol. 20—Issue 3, IEEE Publication.

Patti A. et al., "Super-Resolution video reconstruction with arbitrary sampling lattices and non-zero aperture time http://citeseer.ist.psu.edu/patti97super.html", In IEEE Transactions on Image Processing, 1997, pp. 1064-1078.

PCT International Preliminary Report on Patentability, for PCT Application No. PCT/EP2005/011011, dated Jan. 22, 2007, 8 pages.

PCT Notification of Transmittal of the International Search Report and the Written Opinion of the International Searching Authority, or the Declaration for PCT application No. PCT/US2007/069638, dated Mar. 5, 2008, 9 pages.

PCT Notification of Transmittal of the International Search Report and the Written Opinion of the International Searching Authority, or the Declaration, for PCT Application No. PCT/EP2005/011011, dated Apr. 24, 2006, 12 pages.

PCT Notification of Transmittal of the International Search Report and the Written Opinion of the International Searching Authority, or the Declaration, for PCT Application No. PCT/EP2007/009939, dated May 21, 2008, 13 pages.

PCT Notification of Transmittal of the International Search Report and the Written Opinion of the International Searching Authority, or the Declaration, for PCT Application No. PCT/EP2008/004729, dated Oct. 29, 2008, 9 pages.

Pulli, Kari et al., "Robust Meshes from Multiple Range Maps, http://citeseer.ist.psu.edu/pulli97robust.html", In Proc. IEEE International Conference on Recent Advances in 3-D Digital Imaging and Modeling, 1997.

Rahgozar et al., "Motion Estimation Based on Time-Sequentially Sampled Imagery", IEEE Transactions on Image Processing, 1995.

Rav-Acha, A. et al., "Restoration of Multiple Images with Motion Blur in Different Directions, XP002375829, ISBN: 0-7695-0813-8", Proceedings Fifth IEEE Workshop on Applications on Computer Vision IEEE Comput. Soc, 2000, pp. 22-28.

Sasaki et al., "A Wide Dynamic Range CMOS Image Sensor with Multiple Short-Time Exposures", IEEE Proceedings on Sensors, 2004, pp. 967-972, vol. 2.

Sauer, K. et al., "Efficient Block Motion Estimation Using Integral Projections", IEEE Trans. Circuits, Systems for video Tech, 1996, pp. 513-518, vol. 6—Issue 5.

Schultz, Richard R. et al., "Extraction of High-Resolution Frames from Video Sequences, http://citeseer.ist.psu.edu/schultz96extraction.html", IEEE transactions on image processing, 1996, pp. 996-1011.

Seldin et al., "Iterative blind deconvolution algorithm applied to phase retrieval", J. Opt. Soc. Am. A, 1990, pp. 428-433, vol. 7—Issue 3.

She, Peng et al., "Motion View Reconstruction Method with Real Object Image based on Virtual Object Movement, http://rlinks2.dialog.com/NASApp/ChannelWEB/DialogProServlet?ChName=engineering", Eizo Joho Media Gakkai Gijutsu Hokoku, 2005, pp. 67-70, vol. 29—Issue 17.

Siu, Angus et al., "Image registration for image-based rendering, http://rlinks2.dialog.com/NASApp/ChannelWEB/DialogProServlet?ChName=engineering", IEEE Transactions on Image Processing , 2005, pp. 241-252, vol. 14—Issue 2.

Trussell, H.J. et al., "Identification and restoration of spatially variant motion blurs in sequential images, XP002375828", IEEE Transactions on Image Processing, 1992, pp. 123-126, vol. 1—Issue 1.

Uomori, K. et al., "Automatic image stabilizing system by fulldigital signal processing" IEEE Transactions on Consumer Electronics, 1990, vol. 36, No. 3, pp. 510-519.

Zhang, Junping et al., "Change detection for the urban area based on multiple sensor information fusion, http://rlinks2.dialog.com/NASApp/ChannelWEB/DialogProServlet?ChName=engineering", IEEE International Geoscience and Remote Sensing Symposium, 2005, p. 4, IEEE.

* cited by examiner

HANDHELD ARTICLE WITH MOVEMENT DISCRIMINATION

FIELD OF THE INVENTION

This invention relates to a handheld article, such as a digital camera, including an apparatus which discriminates between voluntary and involuntary movement of the article.

BACKGROUND OF THE INVENTION

Handheld articles such as digital cameras are subject to movement in use, either involuntary (hand-jitter) or voluntary (e.g. panning). It would be useful to discriminate between these two types of movement. It is desired to have an apparatus, e.g., in a handheld article such as a digital camera or other digital camera-enabled portable device, which discriminates between voluntary and involuntary movements of the article.

SUMMARY OF THE INVENTION

According to the present invention there is provided a handheld article having at least one angular rate-sensing gyroscopic sensor and an electronic circuit responsive to the sensor output signal to discriminate between voluntary and involuntary movements of the article as a function of the number of zero crossings per unit time of the signal and the average of the absolute amplitude of the signal.

The axes of the first and second angular rate-sensing gyroscopic sensors may be substantially perpendicular to one another.

The function may be proportional to the number of zero crossings of each signal and inversely proportional to the average of the absolute amplitude of each signal.

The article may include first and second angular rate-sensing gyroscopic sensors with transverse axes, and the electronic circuit may be responsive to both sensor output signals to discriminate between voluntary and involuntary movements of the article.

The electronic circuit may discriminate between voluntary and involuntary movements by determining whether the function, which may be described as:

$$NZC_1/|W|_1 + NZC_2/|W|_2,$$

exceeds a predetermined threshold, where $NZC_1$ and $NZC_2$ are the number of zero crossings per unit time for the output signals from the first and second sensors respectively, and $|W|_1$ and $|W|_2$ are the averages of the absolute amplitude of the output signals from the first and second sensors respectively.

The electronic circuit may discriminate between involuntary movements and sensor noise by determining whether the function falls below a second predetermined threshold less than the first threshold.

In certain embodiments, the article includes a digital camera. The camera may be provided with image processing software responsive to the electronic circuit indicating voluntary and/or involuntary movements to control the processing of the image accordingly. The image processing software may include face detection software which is operable in the absence of the circuit indicating voluntary movement. The image processing software may include de-blur software which is operable in the absence of the circuit indicating voluntary movement.

BRIEF DESCRIPTION OF DRAWINGS

One or more embodiments will now be described, by way of example, with reference to the accompanying drawings, in which.

DETAILED DESCRIPTION OF PREFERRED EMBODIMENTS

Figure 1:
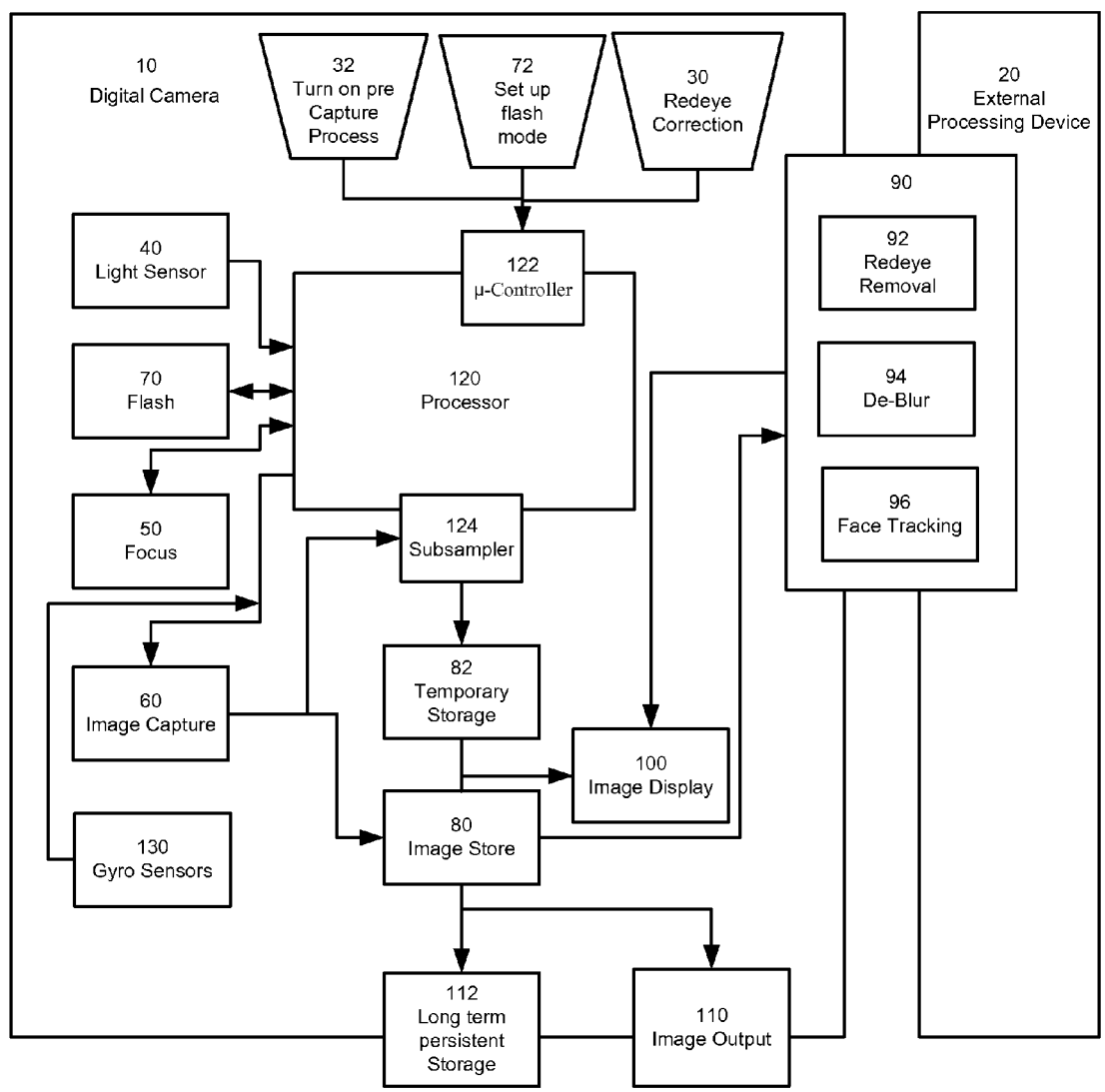
FIG. 1 is a block diagram of a digital camera operating in accordance with one or more embodiments.

FIG. 1 is a block diagram of a portable digital camera 10, operating in accordance with an embodiment of the present invention. It will be appreciated that many of the processes implemented in the digital camera are implemented in or controlled by software operating on a microprocessor, central processing unit, controller, digital signal processor and/or an application specific integrated circuit, collectively depicted as processor 120. All user interface and control of peripheral components such as buttons and display is controlled by a microcontroller 122. The processor 120, in response to a user input at 122, such as half pressing a shutter button (pre-capture mode 32), initiates and controls the digital photographic process.

Ambient light exposure is determined using a light sensor 40 in order to automatically determine if a flash is to be used. The distance to the subject is determined using a focusing mechanism 50 which also focuses the image on an image capture device 60. If a flash is to be used, processor 120 causes a flash device 70 to generate a photographic flash in substantial coincidence with the recording of the image by the image capture device 60 upon full depression of the shutter button.

The image capture device 60 digitally records the image in color. The image capture device is known to those familiar with the art and may include a CCD (charge coupled device) or CMOS to facilitate digital recording. The flash may be selectively generated either in response to the light sensor 40 or a manual input 72 from the user of the camera. The high resolution image recorded by image capture device 60 is stored in an image store 80 which may comprise computer memory such a dynamic random access memory or a non-volatile memory. The camera is equipped with a display 100, such as an LCD, for preview images.

In the case of preview images which are generated in the pre-capture mode 32 with the shutter button half-pressed, the display 100 can assist the user in composing the image, as well as being used to determine focusing and exposure. Temporary storage 82 is used to store one or plurality of the preview images and can be part of the image store 80 or a separate component. The preview image is usually generated by the image capture device 60. For speed and memory efficiency reasons, preview images usually have a lower pixel resolution than the main image taken when the shutter button is fully depressed, and are generated by sub-sampling a raw captured image using software 124 which can be part of the general processor 120 or dedicated hardware or combination thereof.

Various processing functions 90 carried out on the main, high-resolution, image, and/or low resolution preview images, such as redeye detection and correction 92 and de-blurring 94, can be integral to the camera 10 or part of an external processing device 20 such as a desktop computer.

The camera 10 also includes two angular rate-sensing gyroscopic sensors 130 having vertical and horizontal axes respectively (vertical and horizontal refers to the orientation of the axes when the camera is held perfectly upright and level). In the present embodiment each sensor 130 comprises an Analog Devices ADXRS401 single chip sensor capable of measuring up to 75 degrees per second about its axis. The analog output signals from the two sensors are sampled 40,000 times per second for analog-to-digital conversion and applied to the digital processor 120. This allows the processor 120 to discriminate between voluntary and involuntary movement of the camera, as well as between camera movement and electronic jitter, in the following manner.

Figure 2:
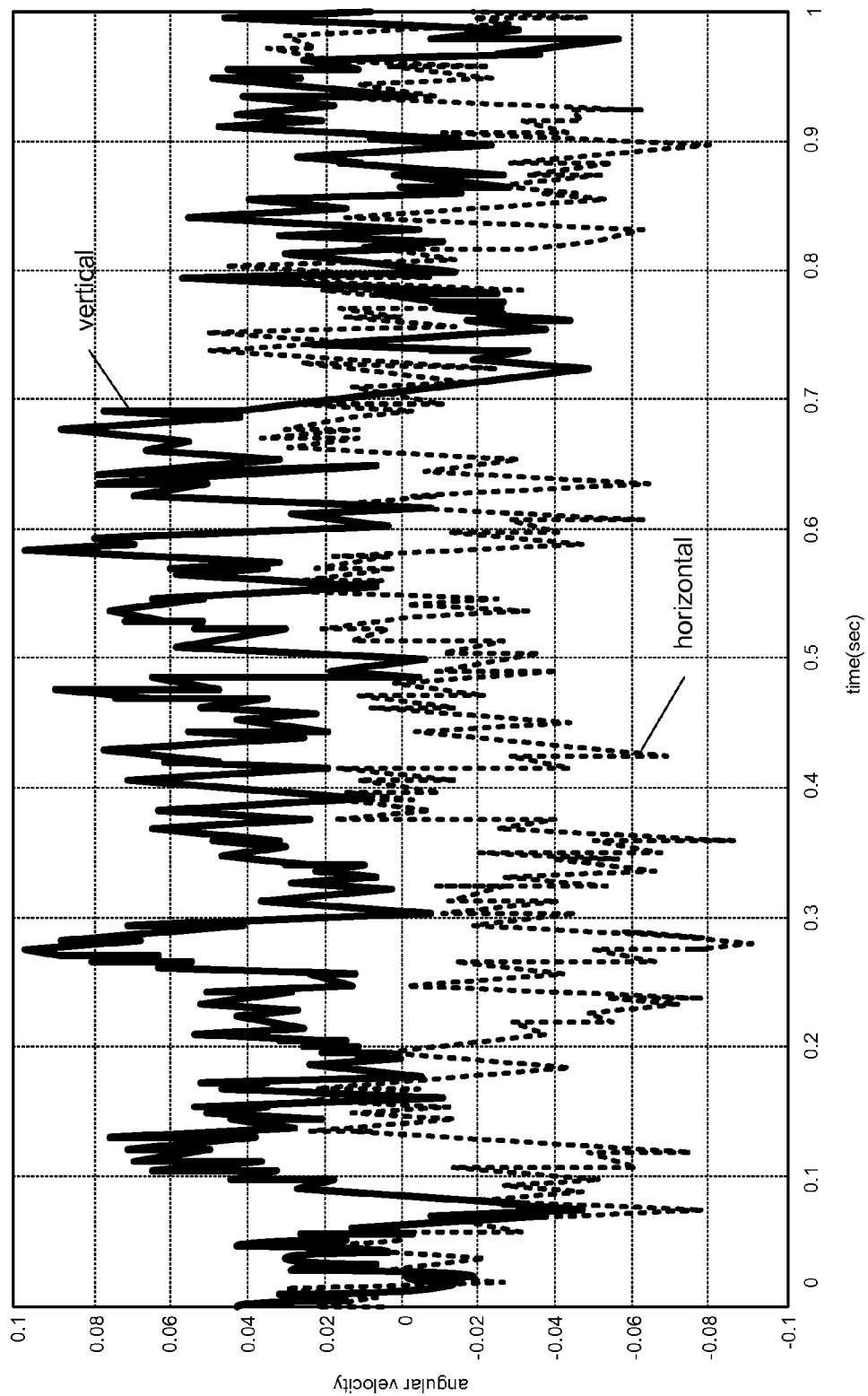
FIGS. 2 to 4 are waveforms useful in understanding the operation of the embodiments described with reference to FIG. 1.

In a digital camera one may encounter three situations:

1. There is no movement (FIG. 2). The sensor output signal is solely electronic jitter (sensor noise).

Figure 3:
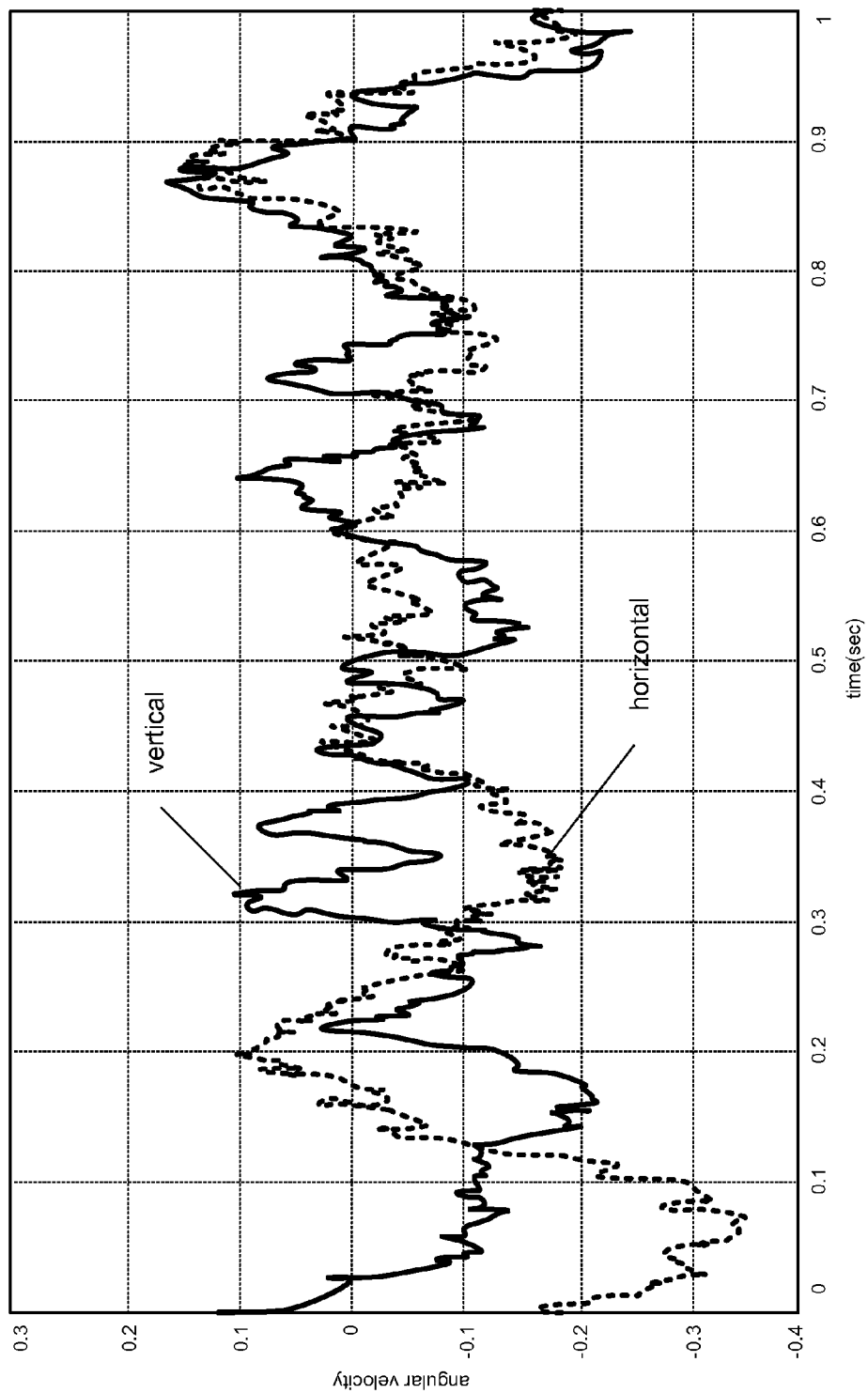

2. There is involuntary hand jitter (FIG. 3). It adds to the sensor noise. Here, the hand jitter is dominant.

3. There is voluntary, desired hand movement (FIG. 4), for example, while panning to follow a moving vehicle. This adds to the involuntary hand jitter and sensor noise, but is dominant.

Sensor noise has a small amplitude and a large percentage of energy in the high frequency domain. Hand jitter increases the amplitude of the sensor output signals and the energy in the low frequency bands, while voluntary movement has the largest amplitude (due to a non-zero DC component) and most of the signal energy near zero frequency. The present embodiment discriminates between these three situations as a function of the number of zero-crossings per second NZC of each sensor signal, which is a measure of frequency, and the average of the absolute amplitude of each sensor signal $\overline{|W|}$ in Volts. The number of zero crossings per second (NZC) of a discrete signal w(n), where n=1, ... N, is:

$$NZC = \sum_{n=1}^{N-1} H(-w(n) \cdot w(n+1)),$$

where $$H(x) = \begin{cases} 0, & x \leq 0 \\ 1, & x > 0 \end{cases}$$

The value of NZC (which refers to the number of zero crossings per second) need not be established by counting zero crossings over a full second, since NZC changes relatively slowly over time and a count of the number of zero crossings taken over, for example, $1/10^{th}$ of a second can be scaled up (in this example by multiplying by 10) and expressed as the number per second. The absolute amplitude of the signal is preferably averaged over the same period as the zero crossing count, but again the absolute average changes relatively slowly over time so exact correspondence is not strictly necessary.

Our tests, using two Analog Devices ADXRS401 single chip sensors mounted on a test board with mutually perpendicular axes and sensor outputs sampled at 40,000 samples per second, have shown that for the three situations above the following criteria generally apply for both horizontal and vertical components of random movement:

1. No movement: NZC ∈ [180; 250] and $\overline{|W|}$ ∈ [0.01; 0.025]
2. Hand jitter: NZC ∈ [50; 160] and $\overline{|W|}$ ∈ [0.03, 0.2]
3. Voluntary movement: NZC<10 and $\overline{|W|}$>0.5

Figure 4:
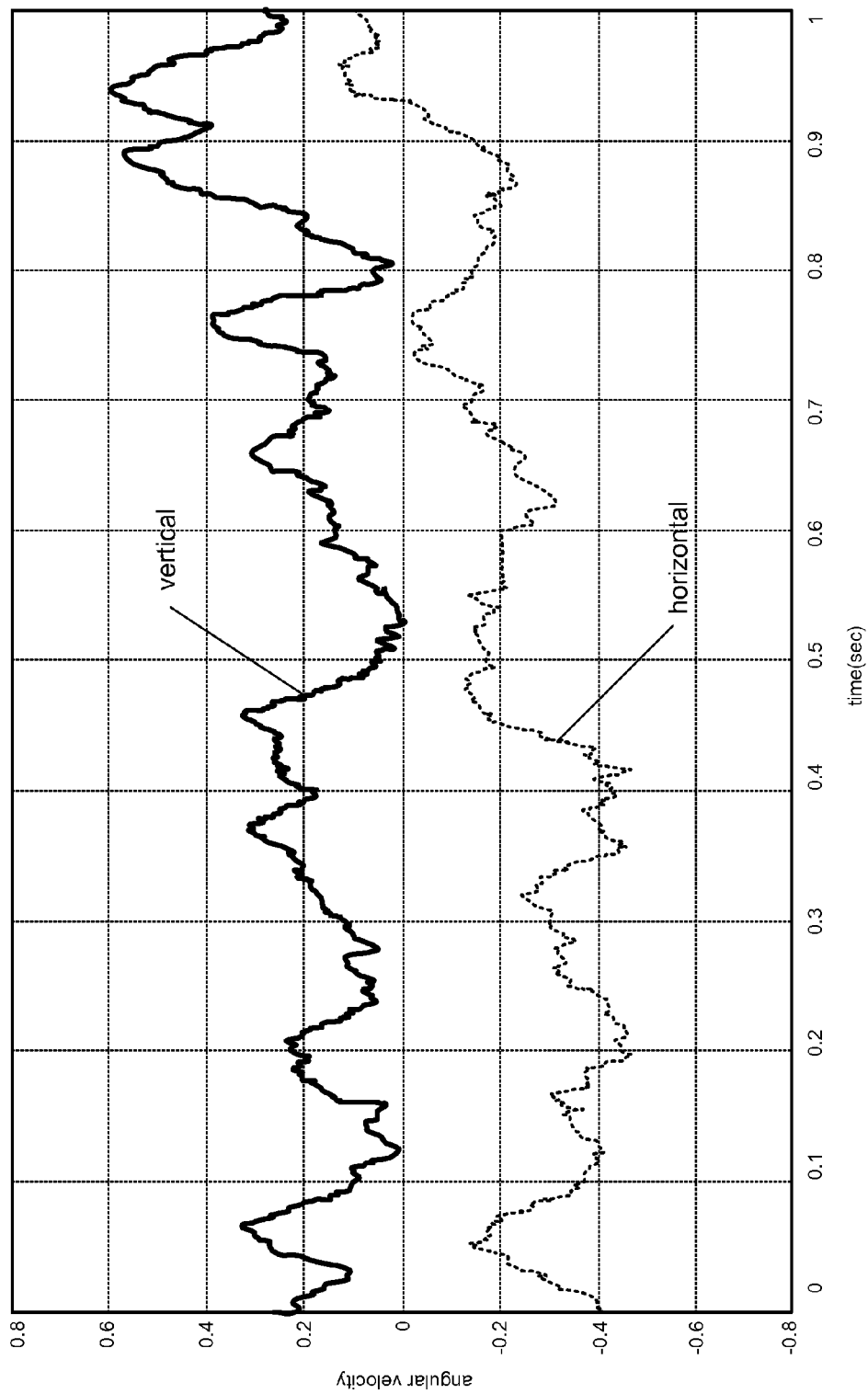

These ranges can therefore be used for discriminating between the three situations. However, unless the movement is predominantly in one direction, the discrimination is likely to be less accurate if the criteria for only one direction (horizontal or vertical) are used for a decision, as one can see in the example below (FIG. 4, $NZC_{hor}$).

Therefore, we have found that a high degree of discrimination accuracy can be obtained by combining the criteria and computing the term:

$$TH = \frac{NZC_{hor}}{\overline{|W|}_{hor}} + \frac{NZC_{vert}}{\overline{|W|}_{vert}}$$

In our tests, we found empirically that if TH were greater than 1200, noise was the predominant factor; if not, hand jitter was present. We found this 1200 threshold to be highly accurate in discriminating between sensor noise and hand jitter. In our tests there were 2% false alarms (noise detected as jitter) and 1.8% misdetection. In 0.16% cases the test indicated voluntary movement instead of hand jitter.

To discriminate between hand jitter and voluntary movement we compared TH with 400, which we found empirically to be a useful threshold to differentiate between these two types of movement. A TH of less than 400 indicated voluntary movement while a TH greater than 400 indicated hand jitter. For soft movements it is hard to define the physical threshold between hand jitter and a voluntary movement. For hard movements, however, the tests proved 100% accurate.

Of course, if different sensors are used, there will be different threshold levels.

FIGS. 2 to 4 are typical waveforms of the sensor outputs for the three situations referred to above.

FIG. 2: Pure sensor noise. As one can see, both of the records have many zero-crossings, but no significant DC component. The high frequencies are much more important as compared to other cases. The energy level is low. The values computed from these records are:

$NZC_{hor}$=321
$NZC_{vert}$=140
$\overline{|W|}_{hor}$=0.025
$\overline{|W|}_{vert}$=00034
TH=54016.47

FIG. 3: Hand jitter is predominant. As one can see, both of the records have insignificant DC components and a rather high number of zero-crossings. The values computed from these records are:

$NZC_{hor}$=78
$NZC_{vert}$=119
$\overline{|W|}_{hor}$=0.093
$\overline{|W|}_{vert}$=0.079
TH=2345.03

FIG. 4: Voluntary movement is predominant. As one can see, both of the records have significant DC components which decreases the number of zero-crossings. The DC component shows the existence of the voluntary movement. The values computed from these records are:

$NZC_{hor}$=15
$NZC_{vert}$=0
$\overline{|W|}_{hor}$=0.182
$\overline{|W|}_{vert}$=0.284
TH=82.42

The above technique is embodied in the camera 10 by the processor 120 iteratively calculating TH from the output signals from the sensors 150, comparing the calculated value with the thresholds 400 and 1200, and setting or clearing a respective flag according to whether TH is greater than 1200, less than 400, or between 400 and 1200. The state of the flags at any given moment will indicate whether the immediately preceding measurement detected sensor noise only, hand jitter or voluntary movement to a high degree of accuracy. This is done cyclically at least while the camera is in preview mode with the shutter button half-depressed, right up to the moment that the final full resolution image is captured. The final state of the flags at the moment the shutter is pressed can be stored as metadata with the image, and used in processing the image, e.g. as an input to the de-blur function 94 or alternatively, the state of the flag can be fed directly to the image processing function. During the preview phase the state of the flags can be used to determine whether to enable or disable an image stabilization function or otherwise used as input to such a function to modify its operation.

In another application, the image processing functions include a face tracking module 96 as described in co-pending application Ser. No. 11/464,083 filed Aug. 11, 2006. Such a module periodically analyses acquired images to detect faces within the images and subsequently tracks these faces from one image to another in an image stream. Face detection is relatively processor intensive and needs to be performed as judiciously as possible. Thus, using the information provided with the present embodiment, the module 96 can for example decide to switch off face detection/tracking when a camera is being voluntarily moved as it might presume that it could not track face movement during panning of the camera, whereas if hand jitter is being experienced, the module can use the degree and direction of movement to attempt to predict where a face candidate region being tracked may have moved from one image in a stream to the next. If noise rather than hand jitter is being experienced, the module 96 could decide to use an existing location for a face candidate region rather than attempting to predict its location based on camera movement.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to the claims below and/or preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

In addition, all references cited herein as well as the background, invention summary, abstract and brief description of the drawings, as well as U.S. Pat. Nos. 6,407,777 and 6,035,072, and US published patent applications nos. 2005/0041121, 2005/0031224, 2006/0204054, 2005/0140801, 2006/0204110, 2006/0098237, 2006/0093212, 2006/0120599, and 2006/0140455, and U.S. patent applications Nos. 60/773,714, 60/804,546, 60/865,375, 60/865,622, 60/829,127, 60/829,127, 60/821,165, 60/803,980, Ser. Nos. 11/554,539, 11/464,083, 11/462,035, 11/027,001, 10/842,244, 11/024,046, 11/233,513, and 11/460,218, are all incorporated by reference into the detailed description of the preferred embodiments as disclosing alternative embodiments.

The invention claimed is:

1. A handheld article having at least one angular rate-sensing gyroscopic sensor and an electronic circuit responsive to a sensor output signal to discriminate between voluntary and involuntary movements of the article as a function of the number of zero crossings per unit time of the signal and the average of the absolute amplitude of the signal, and wherein the function is proportional to the number of zero crossings of the signal and inversely proportional to the average of the absolute amplitude of the signal.

2. An article as claimed in claim 1, including first and second angular rate-sensing gyroscopic sensors with transverse axes, the electronic circuit being responsive to both sensor output signals to discriminate between voluntary and involuntary movements of the article.

3. An article as claimed in claim 2, wherein the axes of the first and second angular rate-sensing gyroscopic sensors are substantially perpendicular to one another.

4. A handheld article having first and second angular rate-sensing gyroscopic sensors with transverse axes that are substantially perpendicular to one another, and an electronic circuit responsive to sensor output signals, to discriminate between voluntary and involuntary movements of the article as a function of the number of zero crossings per unit time of the signal and the average of the absolute amplitude of the signal, wherein the electronic circuit discriminates between the voluntary and involuntary movements by determining whether the function $$NZC_1/|W|_1 + NZC_2/|W|_2$$

exceeds a predetermined threshold, where $NZC_1$ and $NZC_2$ are the number of zero crossings per unit time for the output signals from the first and second sensors respectively, and $|W|_1$ and $|W|_2$ are the averages of the absolute amplitude of the output signals from the first and second sensors respectively.

5. An article as claimed in claim 1 or claim 4, wherein the article is a digital camera.

6. An article as claimed in claim 5 wherein the camera is provided with image processing software responsive to said circuit indicating either voluntary and involuntary movement to control the processing of said image accordingly.

7. An article as claimed in claim 6 wherein said image processing software comprises face detection software which is operable in the absence of said circuit indicating voluntary movement.

8. An article as claimed in claim 6 wherein said image processing software comprises de-blur software which is operable in the absence of said circuit indicating voluntary movement.

9. An article as claimed in claim 3 or claim 4, wherein the electronic circuit further discriminates between involuntary movements and sensor noise by determining whether the said function falls below a second predetermined threshold less than the first threshold.

10. An article as in claim 9, wherein the function is proportional to the number of zero crossings of the signals and inversely proportional to the average of the absolute amplitude of the signals.

* * * * *